US012699390B2

(12) United States Patent
Poduval et al.

(10) Patent No.: US 12,699,390 B2
(45) Date of Patent: Aug. 4, 2026

(54) FILTERED PLANNING OF PATH FOR A VEHICLE

(71) Applicant: Deere & Company, Moline, IL (US)

(72) Inventors: Manu Poduval, Pune (IN); Shriraam Prabu Subramanian, Pune (IN)

(73) Assignee: Deere & Company, Moline, IL (US)

( * ) Notice: Subject to any disclaimer, the term of this patent is extended or adjusted under 35 U.S.C. 154(b) by 869 days.

(21) Appl. No.: 17/990,978

(22) Filed: Nov. 21, 2022

(65) Prior Publication Data

US 2024/0168481 A1    May 23, 2024

(51) Int. Cl.
*G05D 1/02* (2020.01)
*A01B 69/00* (2006.01)
*A01B 69/04* (2006.01)
*G05D 1/00* (2006.01)

(52) U.S. Cl.
CPC ......... *G05D 1/0219* (2013.01); *A01B 69/001* (2013.01); *A01B 69/008* (2013.01); *G05D 1/0287* (2013.01)

(58) Field of Classification Search
CPC .. A01B 69/008; G05D 1/0219; G05D 1/0287; G05D 1/246; G05D 1/6486; G05D 2105/15; G05D 2107/21; G05D 2109/10
See application file for complete search history.

(56) References Cited

U.S. PATENT DOCUMENTS

| 8,498,788 B2 | 7/2013 | Kondekar | |
| 9,696,162 B2 | 7/2017 | Anderson | |
| 10,315,655 B2 | 6/2019 | Blank et al. | |
| 11,112,262 B2 | 9/2021 | Anderson | |
| 11,395,452 B2 | 7/2022 | McDonald et al. | |
| 11,635,765 B2 | 4/2023 | Vandike et al. | |
| 11,641,790 B2 | 5/2023 | Smith et al. | |
| 2005/0192749 A1* | 9/2005 | Flann | G01C 21/20 |
| | | | 701/410 |
| 2007/0239472 A1 | 10/2007 | Anderson | |
| 2017/0122742 A1* | 5/2017 | Schleicher | G01C 21/14 |
| 2019/0343035 A1* | 11/2019 | Smith | A01B 69/004 |
| 2021/0088354 A1* | 3/2021 | Anderson | A01B 79/005 |

* cited by examiner

*Primary Examiner* — Peter D Nolan
*Assistant Examiner* — Ce Li Li
(74) *Attorney, Agent, or Firm* — McDonald Hopkins LLC; James P. Muraff

(57) ABSTRACT

Systems and methods for planning and filtering a path of a vehicle in a work area or field are described. An example system includes a user interface that supports a selection of a threshold value used to filter the path of the vehicle. The system also includes a data processor that receives the path that defines guidance lines and transitions between guidance lines and filters the path by deleting portions of the guidance lines that do not satisfy the threshold value. The guidance lines define movement of the vehicle though a work area or field. The system includes a guidance module that controls at least one motive function of the vehicle based on the filtered path.

10 Claims, 6 Drawing Sheets

500

YIELD LEVEL FILTER

502

CROP DESTRUCTION % LEVEL

504

OPERATION PROFIT LEVEL

506

FILTERED PLANNING OF PATH FOR A VEHICLE

TECHNICAL FIELD

The present invention is generally related to vehicle guidance and, more specifically, planning and filtering a path of a vehicle.

BACKGROUND

Increasingly, vehicles include guidance systems that determine a path defined by a series of guidance lines and transitions between guidance lines for covering an area of a field or a work area. Some systems are guidance systems that provide steering guidance on a display to guide an operator on how to steer the vehicle. Some systems are semi-autonomous systems where a control unit of the vehicle controls at least some of the motive functions of the vehicle. Some systems are autonomous systems where the control unit of the vehicle controls the motive functions of the vehicle, with or without an operator in the vehicle. Some of these system also facilitate coordination of work on the path between multiple vehicles.

SUMMARY

A method and system for planning a path of a vehicle that considers non-geographic features of an area of a field or a work area is described herein. An operator or planner selects how the non-geographic features influence the planning a path of the vehicle. The system plans guidance lines and transitions to generate the paths based on the non-geographic features. In some examples, the system may filter or otherwise regenerate an already planned or used path to take into account the non-geographic features. The path may be dynamically (e.g., automatically) or periodically (e.g., in response to operator input) updated when the data of the non-geographic features is created and/or updated. The path is presented to the operator (e.g., via a display) to facilitate operating the vehicle and/or is provided to a control unit to operate the vehicle according to the path.

An example system includes a user interface that supports a selection of a threshold value used to filter the path of the vehicle. The system also includes a data processor that receives the path that defines guidance lines and transitions between guidance lines and filters the path by deleting portions of the guidance lines that do not satisfy the threshold value. The guidance lines define movement of the vehicle though a work area or field. The system includes a guidance module that controls at least one motive function of the vehicle based on the filtered path.

An example method includes receiving, on a user interface on a display, a selection of a threshold value used to filter the path of the vehicle. The method also includes receiving, by a data processor, the path that defines guidance lines and transitions between guidance lines and filtering the path by deleting portions of the guidance lines that do not satisfy the threshold value. The guidance lines define movement of the vehicle though a work area or field. The method also includes controlling, by a guidance module, at least one motive function of the vehicle based on the filtered path.

BRIEF DESCRIPTION OF THE DRAWINGS

Operation of the present disclosure may be better understood by reference to the following detailed description taken in connection with the following illustrations, wherein.

DETAILED DESCRIPTION

Figure 1:
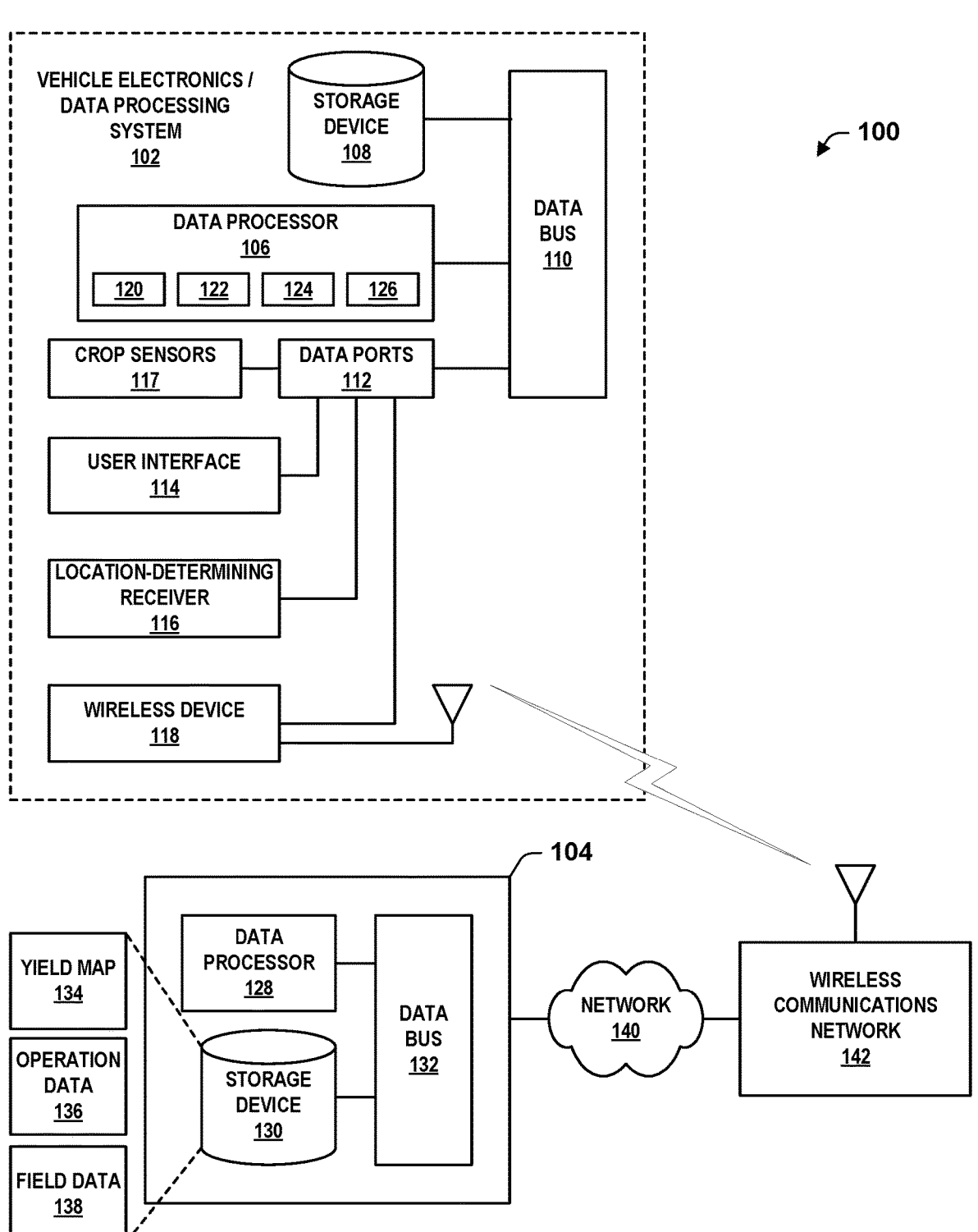
FIG. 1 is a block diagram of a system for planning and/or executing a path of a vehicle, in accordance with the teachings of this disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Planning a path begins by defining or obtaining an outer boundary of a work area or a field. The outer boundary may be determined, for example, using map data, satellite data, and/or navigation data and/or sensor data from a vehicle. In some examples, the path is based on a first pass of the work area or the field made by the operator. The path is made up of a series of recorded position points along one or more guidance paths that set forth a set of plant rows defined with reference to the path in the work area or the field. The guidance paths are connected by transitions that often take place out of the work area of interests. The guidance paths are planned such that the length of the implement (e.g., sprayer, planter, harvester, etc.) being operated by the vehicle covers the work area or the field in as few passes as possible while the wheels of the vehicle and implement do not contact the plants growing or being harvested in the work area or the field. Generally, the path covers the work area or the field. However, not all areas of the work area or the field are of equal interest. Conditions of the work area or the field may change as time passes. Parts of the work area or the field may be or may become less desirable over time to traverse. For example, the wear and maintenance on the vehicle and/or operation cost of the vehicle may not be worth traversing the work area or the field. As such, there is a need to plan or replan paths to increase the productivity of the vehicle while minimizing maintenance and/or the operational costs of the vehicle.

As described herein, a system plans a path traversing the work area or the field using non-geographic data to not traverse areas of the field that do not meet parameters set by an operator. In some examples, the non-geographic data includes yield data from a yield map that specifies a distribution of yield across different areas of the field. In some examples, the non-geographic data includes crops destruction data that identifies areas along a guidance line that are likely to be damaged as a result of the vehicle and/or implement traversing the guidance line at that area. In some examples, the non-geographic data includes operation cost data that identifies the cost to operate the vehicle and/or implement in areas of the field. The system provides the operator with an input to specify thresholds for the non-geographic data. The system uses those thresholds to generate a new path or modify (sometimes referred to as "filter") the guidance lines of an existing path to, for example, maximize the traversal of the vehicle in areas that have a yield above a yield threshold, minimize traversal of the vehicle in areas that have a yield below the yield threshold, minimize traversal of the vehicle in areas that would destroy crops above a destruction threshold, and/or minimize traversal of the vehicle in areas that have an operating cost above an operation threshold, etc. In some examples, the system treats areas identified as below the yield threshold as a headland for purposes of planning transitions between guidance paths. Because the non-geographic data may change from time-to-time (e.g., between traversals of the path, etc.), the system may update/replan the path dynamically, periodically, and/or as a result of operator input.

FIG. 1 is a block diagram of a system 100 for planning and/or executing a path of a vehicle. In the illustrated example, the system 100 includes a vehicle with vehicle electronics 102 (sometimes referred to as a "data processing system") and a central processing system 104. While FIG. 1 illustrates the vehicle electronics 102 and the central processing system 104, in some examples, the data (as described below) may be stored on the vehicle electronics 102 and the processes and/or services (as described below) may operate on the central processing system 104, with the path being transmitted to the vehicle electronics 102. Additionally, while FIG. 1 illustrates a single vehicle with the vehicle electronics 102, two or more vehicles with the vehicle electronics 102 may cooperate to perform the methods described herein (e.g., distribute tasks and/or processing, etc.).

The vehicle electronics 102 includes a data processor 106, a storage device 108, and a data bus 110 connecting the data processor 106, the storage device 108, and a data port 112. A user interface 114, a location determining receiver 116, one or more crop sensors 117, and a wireless communications device 118 are connected to the data port 112 to facilitate communication with the data processor 106 and the storage device 108.

The data processor 106 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The storage device 108 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the storage device 108 includes multiple kinds of memory, particularly volatile memory and non-volatile memory. The storage device 108 is computer readable media on which one or more sets of instructions, such as the software for operating the methods of the present disclosure, can be embedded. The instructions may embody one or more of the methods or logic as described herein. In a particular embodiment, the instructions may reside completely, or at least partially, within any one or more of the storage device 108, the computer readable medium, and/or within the data processor 106 during execution of the instructions. As described below, storage device 108 and/or the storage device 128 may include multiple processes and/or services to plan and/or filter a path based on non-geographic data, such as path planning module 120, a yield estimator 122, a crop destruction estimator 124, and guidance module 126.

The user interface 114 provides an interface between the vehicle electronics 102 and the operator. The user interface 114 includes digital and/or analog interfaces (e.g., input devices and output devices) to receive input from the operator and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers. Additionally, the user interface 114 includes a graphic user interface (GUI) to present information to the operator and to receive input from the operator. The operator uses the user interface 114 to set thresholds used to plan or filter the path of the vehicle. In some examples, one or more functions of the user interface 114 may be presented though mixed reality (e.g., virtual reality, augmented reality, etc.) and/or may be presented via a remote system.

Figure 5:
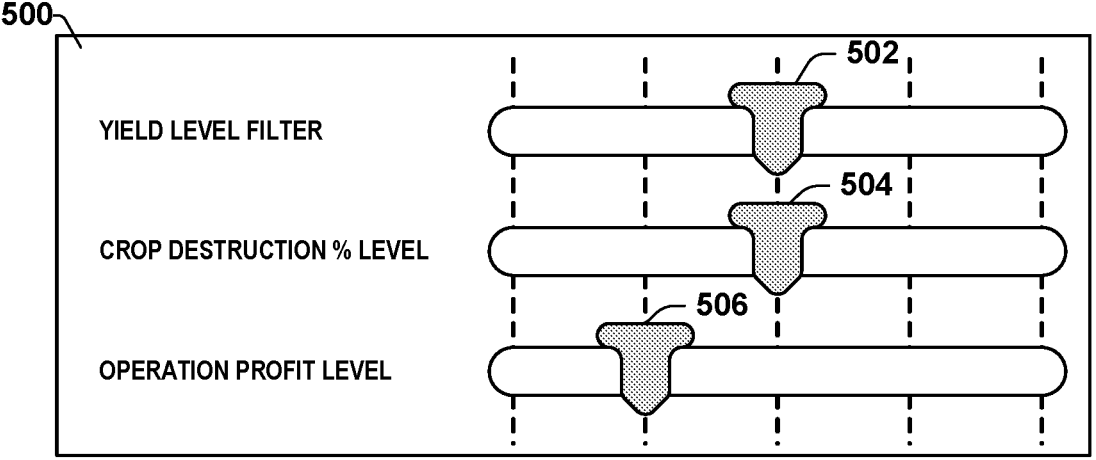
FIG. 5 illustrates an example user interface to receive operator input to filter and plan the guidance lines by the system FIG. 1, in accordance with the teachings of this disclosure.

FIG. 5 illustrates an example threshold graphical user interface (GUI) 500 displayed on the user interface 114 to facilitate the operator entering the desired thresholds. The example threshold GUI 500 includes a yield slider 502 to facilitate setting a yield threshold, a destruction slider 504 to facilitate setting a destruction threshold, and an operation slider 506 to facilitate setting an operation threshold. Each position of the sliders 502, 504, and 506 may correspond to a threshold setting. For example, each position of the yield slider 502 may represent a yield zone of the minimum estimated yield when replanning the guidance lines. For example, each position of the destruction slider 504 may represent a maximum percentage of crop destruction that is acceptable when replanning the guidance lines. For example, each position of the operation slider 506 may represent a minimum operation level that is acceptable when replanning the guidance lines. While the threshold GUI 500 is illustrated as a set of sliders 502, 504, and 506, the threshold GUI 500 may be any suitable interface that facilitates the operator specifying the thresholds.

The location determining receiver 116 receives signals that provide the coordinates (e.g., longitude and latitude) of the vehicle. The location determining receiver 116 may be compatible with one or more satellite-based navigation systems, such as Global Navigation Satellite System (GLO-NASS), Galileo, and/or BeiDou Navigation Satellite System, etc.

The crop sensors 117 yield monitor provides measurements to facilitate estimating the yield of the field around the vehicle to (1) monitor actual yield (e.g., as predicted by yield map data) with actual yield and/or (2) estimate yield in a radius around the vehicle to trigger a replanning of the path to reduce traversal of the vehicle in areas with a yield below the operator-set yield threshold. While the crop sensors 117 are illustrated as incorporated into the vehicle electronics 102, the crop sensors may additionally or alternatively be installed on an implement (e.g., fertilizer, a harvester, etc.) coupled to the vehicle. For example, the implement may include an impact plate with a piezoelectric sensor or a microwave volumetric sensor that provides an estimate of the yield of harvested crop. The crop sensors 117 may include an imaging device, such as a monocular camera or stereo camera, or LIDAR, and RADAR, to take measurements for the vehicle electronics 102 and/or the central processing system 104 to estimate crop height, density, and color for yield estimation, alone or together with yield monitor data (of already harvested or partially harvested crop) for truthing or providing reference data for the imaging data. The imaging devices might sense humanly visible light, or any combination of visible light, infrared, near infrared, and ultraviolet frequency/bandwidth ranges among others. The measurements from the crop sensors 117 may be subsequently used when the system 100 filters guidance lines. For example, data from the crops sensors 117 measured when the vehicle traverses the path at a first time performing a first operation (e.g., fertilizing the work area or field) may be used to filter the path before the vehicle traverses the path at a second time to perform a second operation (e.g., harvesting the work area or field).

The vehicle wireless communication device 118 includes one or more controllers for standards-based networks (e.g., GSM, UMTS, LTE, CDMA, WiMAX, etc.), satellite communication networks, and/or wireless local area networks (e.g., WiFi®, Wireless Gigabit, etc.), etc. In some examples, the vehicle wireless communication device 118 includes controllers for personal area networks (e.g., Bluetooth®, ZigBee® ("IEEE 802.15.4"), Near Field Communication ("NFC"), etc.) to communicatively couple the vehicle to a mobile device (e.g., a smart phone, a tablet, a smart watch, etc.).

The central processing system 104 is maintained by any suitable entity (e.g., an equipment manufacturer, a government agency, a university, an insurance agency, a cooperative, a professional and/or commercial association, etc.) that provides agricultural support services to operators of agricultural equipment. The central processing system 102 communicates with the vehicle electronics 102 to facilitate planning or filtering of the path based on non-geographic data. In some examples, the non-geographic data may be stored by the central processing system 104.

The central processing system 104 includes a data processor 128, a data storage device 130, and a data bus 132. In the illustrated example, the central processing system 104 includes various components for illustrative purposes, the central processing system 104 may be instantiated on one or more physical and/or virtual servers. The data processor 128 may be any suitable processing device or set of processing devices such as, but not limited to: a microprocessor, a microcontroller-based platform, a suitable integrated circuit, one or more field programmable gate arrays ("FPGAs"), and/or one or more application-specific integrated circuits ("ASICs"). The data storage device 130 includes volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), and/or any high-capacity storage devices, such as hard drives, and/or solid state drives. The data storage device 130 is a computer readable medium on which one or more sets of instructions, such as the software for operating the methods of the present disclosure can be embedded. In the illustrated example, the data storage device 130 includes non-geographic data, including yield map data 134 and operation data 136. The data storage device 130 may also include geographic data, such as field data 138. The yield map data 134 provides a distribution of yield produced across different areas of the field. In some examples, the yield map data 134 organizes areas of the field into categories (e.g., low yield, low-moderate yield, moderate yield, moderate-high yield, and high yield, etc.). The yield map data 134 may be based on, for example, an analysis of soil quality estimates, fertilizer usage, weather, the geography of the field, and/or sensor measurements collected by the vehicle electronics 102 (e.g., via the crop sensors 117), etc.

The operation data 136 includes data regarding operation costs of operating the vehicle. For example, the operation data 136 may include fuel consumption data to estimate the fuel consumption to traverse the guidance lines of the path, estimated labor costs for the time to traverse the path, vehicle maintenance cost estimates to estimate the time and/or distance based-cost of operating the vehicle along the path. In some examples, the operation data 136 may be associated with the field-of-interest and take into account field specific data, such as terrain grade, clearance for an implement, availability and size of headlands, and/or soil stability, etc. In some such examples, the operation data 136 may organize areas of the field into categories (e.g., low cost, moderate cost, high cost, etc.). In some examples, the operation data 136 includes price per yield data that, combined with yield data, facilitates estimating the sell price of the product to be harvested on the field.

The field data 138 includes data regarding geographical features of the field and/or row lines that define a series of coordinates that identify the rows of planted crops. The row lines may be defined, for example, when a planter is deployed on the field and may depend on the characteristics of the planter (width of crop row, width of space between the crop rows, etc.). Generally, the guidance lines are defined in relation to the crop row data.

The vehicle electronics 102 and the central data processing system 104 communicate via a network 140 and a communications network 142. The communications network 140 may be a public network, such as the Internet; a private network, such as an intranet; or combinations thereof. The communications network 142 communicatively couples the vehicle electronics 102 to the network 140. The communications network 142 may facilitate a wide area network (e.g., such as a cellular network (e.g., Global System for Mobile Communications ("GSM"), Universal Mobile Telecommunications System ("UMTS"), Long Term Evolution ("LTE"), Code Division Multiple Access ("CDMA"), etc.), a satellite communication network, WiMAX ("IEEE 802.16m), etc.), and/or a location area network (e.g., IEEE 802.11 a/b/g/n/ac, etc.).

The path planning module 120 establishes or receives a path that defines guidance lines for the vehicle to follow and transitions between guidance lines to connect guidance lines. Examples of establishing the path are described in U.S. Pat. No. 11,112,262 entitled, "Method and System for Planning a Path of a Vehicle," granted Sep. 7, 2021, which is herein incorporated by reference in its entirety. Guidance lines are defined by spatial coordinates that may be as discretely defined as the accuracy of the GNSS system used to map the field or work area (e.g., points defined every 20 cm, etc.) As described below, the path planning module 120 may filter the guidance lines as finely as this accuracy. In some examples, the path planning module 120 may be configured to filter at a more coarse accuracy (e.g., 5 meters, 10 meters, etc.) because, for example, operators may not be aware or may not desire changes to the guidance lines that are finer. As used herein, a segment represents the distance that the path planning module 120 considers when filtering a guidance line. For example, a segment may be 10 meters. In some examples, the operator (e.g., via the interface 114) is able to select the length of the segment.

The path planning module 120 filters and/or modifies the guidance lines of a defined path based on non-geographic data, such as yield data, operation data, and/or crop destruction data, etc. The path planning module 120 receives or otherwise retrieves thresholds set by the operator via the user interface 114. The threshold may include a yield threshold (sometimes referred to as a "yield level filter"), a destruction threshold (sometimes referred to as a "crop destruction percent level"), and an operation threshold (sometimes referred to as an "operation profit level"). The path planning module 120 uses the thresholds to delete or modify segments of guidance lines that do not meet the requirements of the set by the operator as reflected by the thresholds. The path planning module 120 may filter the path (1) in response to the operator changing the thresholds, (2) the vehicle electronics 102 and/or the central data processor 104 detecting changes (e.g., via the crop sensors 117) to the conditions around the vehicle, (3) a change in the non-geographic data, (4) periodically, (5) before the start of the traversal of the path, and/or (6) upon an input from the operator, etc.

The path planning module 120 analyzes each guidance line to determine if the area around the guidance line (e.g., the area that is going to be affected by the implement) meets the thresholds set by the operator. In some examples, the path planning module 120 analyzes the guidance lines segment-by-segment. When a segment or portion of the guidance line does not meet all of the thresholds, the path planning module 120 deletes or modifies that segment or portion. The path planning module 120 analyzes each segment or portion to determine whether the calculated yield level around that segment or portion satisfies (e.g., is equal to or greater than) the yield threshold. To facilitate this filtering by the path planning module 120, the yield estimator 122 estimates yield along the guidance lines of the path. The yield estimator 122 receives the yield map 134 containing the yield data for the field. The yield map 134 provides coordinate based yield data such that the yield estimator 122 estimates the yield of the guidance line based on the yield map 134 and the width of the implement performing the agricultural function (e.g., planter, fertilizer, harvester, etc.). If it does not, the path planning module 120 deletes or modifies that segment or portion of the guidance line. In some examples, if the implement will partially pass through a yield zone below the threshold, the path planning module 120 does not delete or modify the corresponding segment of the guidance line. For example, because of the width of the implement, one third of the implement attached to the vehicle may pass through a yield zone below the yield threshold. Rather, in such examples, the path planning module 120 may use the operation cost threshold to determine whether such segments of the guidance line should be deleted or modified.

Figure 2A:
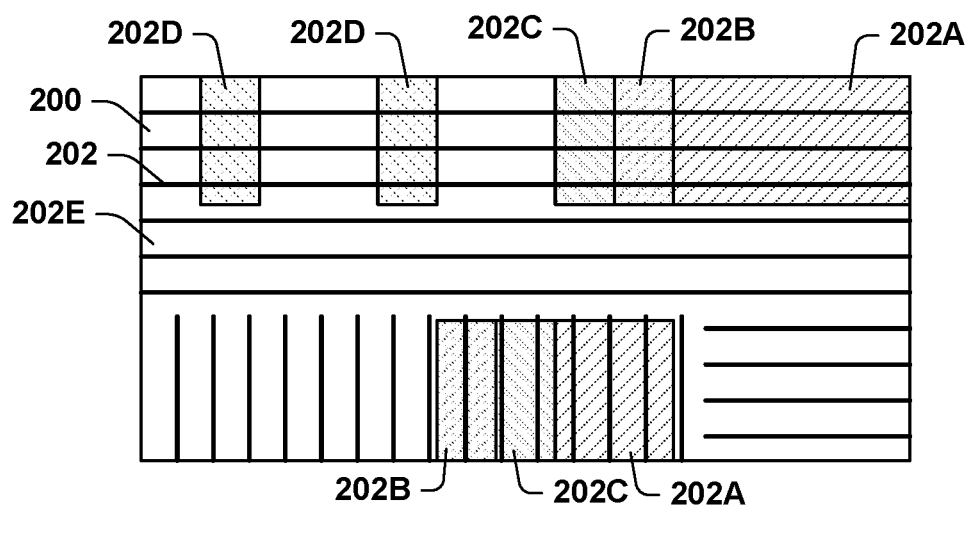
FIGS. 2A and 2B illustrate a path of a vehicle as planned by the system of FIG. 1, in accordance with the teachings of this disclosure.
Figure 2B:
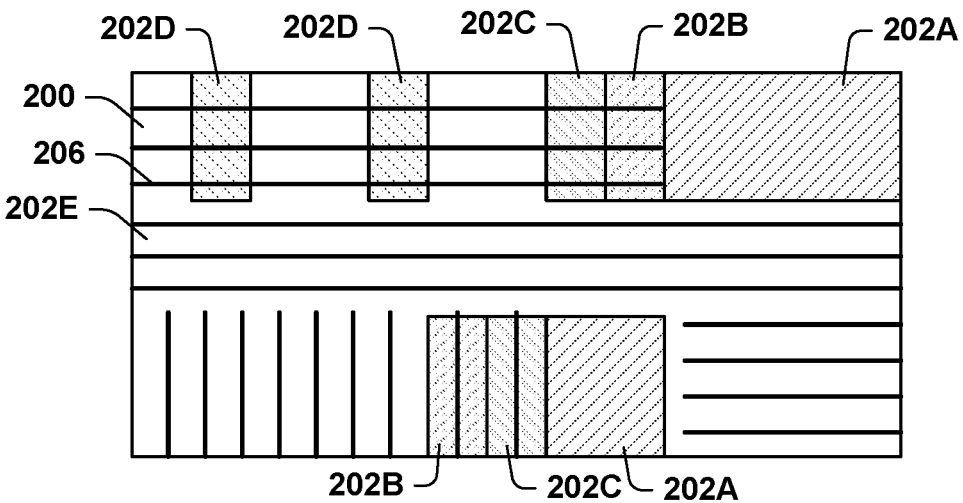

FIGS. 2A and 2B illustrate a map of a field 200 with guidance lines 202 of a path (transitions omitted for simplicity) with yield zones 204A-204E overlaid on the map of the field 200. The yield data is received or otherwise retrieved form the central data processing system 104. In the illustrated examples, the yield zones include low yield zones 204A, low-moderate yield zones 204B, moderate yield zones 204C, moderate-high yield zones 204D, and high yield zones 204E. FIG. 2A illustrates the defined guidance lines 202 before the path planning module 120 filters the guidance lines 202. FIG. 2B illustrates replanned guidance lines 206 after the path planning module 120 filters the guidance lines 202 based on the yield threshold. In the illustrated example of FIG. 2B, the yield threshold is set to exclude the low yield zones 204A.

The path planning module 120 then determines whether the calculated crop destruction level satisfies (e.g., is less than or equal to) the destruction threshold. To facilitate this filter, the crop destruction estimator 124 may estimate a percentage of crop destruction along the guidance line based on the row data included in the field data 138. For example, the crop destruction estimator 124 may estimate that 25% of the crops along the guidance line may be destroyed as a result of the vehicle and implement traversing the segment of the guidance line. The crop destruction estimator 124 determines when two guidance lines intersect and/or crop rows intersect. Based on the attributes of the vehicle and the implement (e.g., wheel base, wheel width, vehicle width, implement wheel base, implement wheel width, implement width, etc.) and function of the implement (e.g., a fertilizing implement may represent more destruction than a harvesting implement, etc.), the crop destruction estimator 124 estimates which portions of the crop would be destroyed (e.g., trampled by the vehicle and/or the implement, etc.) should the vehicle and implement traverse that segment of the guidance line. If traversing the segment of the guidance line would destroy a percentage of crops within the width of the implement above the destruction threshold as determined by the crop destruction estimator 124, the path planning module 120 deletes or modifies that segment or portion of the guidance line. In some examples, when two guidance lines cross, the path planning module 120 prioritizes (e.g., doesn't delete) one set of the intersection guidance lines. The path planning module 120 may prioritize guidance lines based on orientation of the guidance lines (e.g., prioritizes east-west over north-south), the location of the guidance lines relative to the headlands (e.g., prioritize guidance lines that cause the vehicle to intersect the headlands), and/or traversal direction (e.g., prioritize the guidance lines that the vehicle will traverse first), etc.

The path planning module 120 then determines whether a calculated operation level satisfies (e.g., is greater than or equal to) the operation threshold. In some examples, the implement may, by traversing a segment of the guidance line, may only pass over/through crop rows that are less than the width of the implement. For example, if the width of the implement normally passes over 8 rows, some segments may cause the implement to pass over 3 rows. In some examples, the path planning module 120 regards crop rows in yield zones below the yield threshold as not existing for the purposes of the calculated operation level. The path planning module 120 also considers the operational costs in the operation data 136, the weather, and the current condition of the field. In some examples, the path planning module 120 calculates the operational level according to Equation 1 below.

$$\text{Operational Level} = \frac{Y_G}{(F + L + O)} \qquad \text{Equation 1}$$

In Equation 1 above, $Y_G$ is the expected yield price of the segment where the expected yield price is the yield (e.g., from the yield map 134) multiplied by the estimated selling price of that yield, F is the estimated fuel cost of traversing that section (e.g., based on the operation data 136), L is the portion of the labor cost attributable to the segment, and O is the portion of the operational and maintenance cost associated with the segment. For example, if the labor cost to operate the vehicle is $20 per hour and it takes 7 seconds to traverse a 10 meter segment, L would be $0.04 for the segment. An operation threshold of 1 or greater represents that the operator is likely to break even (1) or make a profit (<1) on the segment. The operational level may be lower where it takes longer to traverse the segment (e.g., difficult terrain, difficult geometry, etc.), where yield is less (e.g., implement harvesting only a few row, the segment is fully or partially in a lower yield zone, etc.), and/or the maintenance is expected to be higher (e.g., due to weather, field conditions, age of vehicle and/or implement, etc.). In some examples, the fuel cost (F), the labor cost (L) and the operational cost (O) may be estimated for the life cycle of the field (e.g., from planting to harvesting). These costs may also include costs of any other vehicle (e.g., a grain trailer, etc.) used during the operation. If the operation cost does not satisfy the operation threshold, the path planning module 120 deletes or modifies that segment or portion of the guidance line.

After the path planning module 120 filters the guidance lines and establishes the transitions to generate the path, the guidance module 126 operates the vehicle according to the path. In some examples, the guidance module 126 autonomously controls the vehicle to follow the guidance lines based on, for example, the readings from the location-determining receiver 116. In some examples, the guidance module 126 provides semi-autonomous control of the vehicle where an operator controls the vehicle on the guidance lines via an interface presented on the user interface 114 and the guidance module 126 controls the vehicle during the transitions. In some examples, the guidance module 126 provides an visual overlay onto a camera feed with the point-of-view of the front of the vehicle to guide the operator while following the guidance lines and the transitions.

Figure 3A:
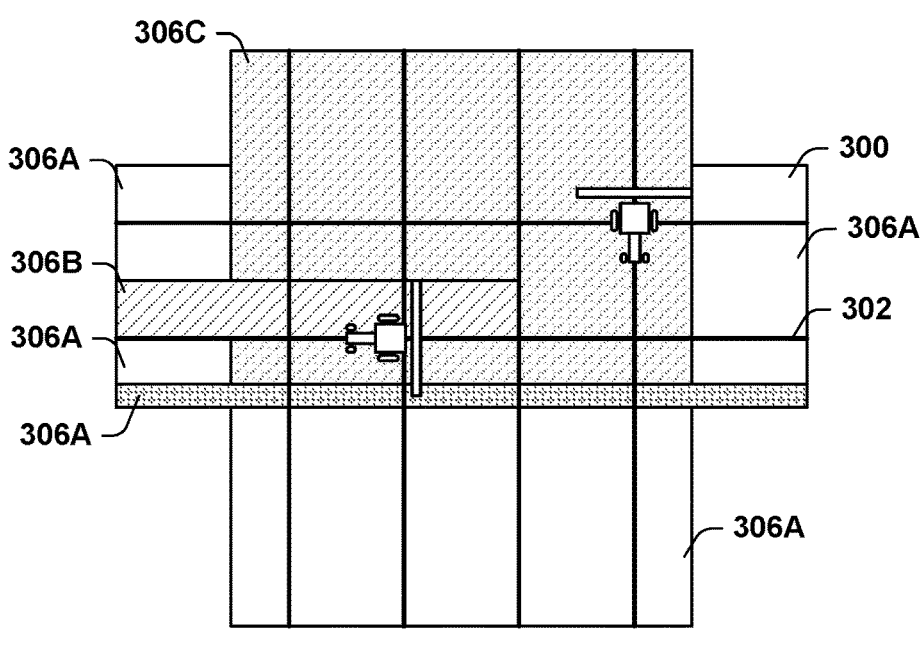
FIGS. 3A and 3B illustrate filtering and planning guidance lines by the system FIG. 1, in accordance with the teachings of this disclosure.
Figure 3B:
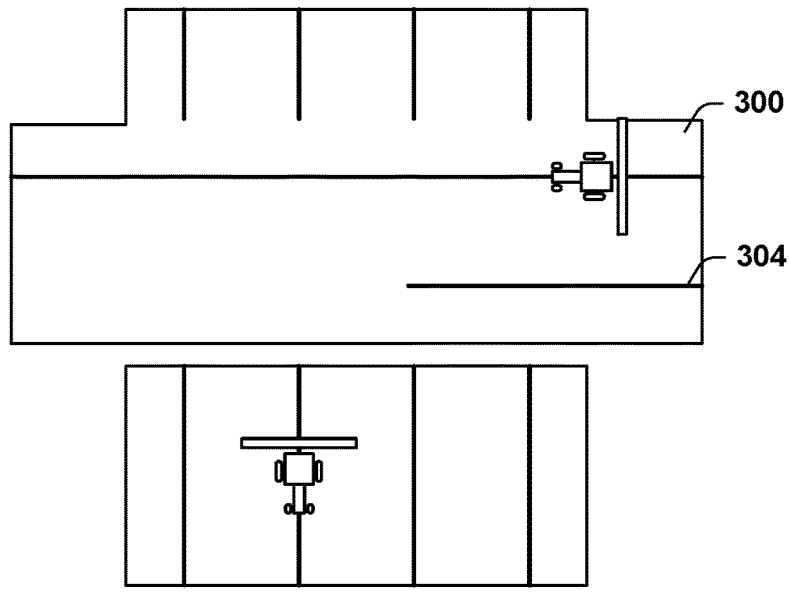

FIGS. 3A and 3B illustrate a portion of a field 300. FIG. 3A shows the field 300 with guidance lines 302 before the path planning module 120 applies the filters describe above. FIG. 3B illustrates the guidance lines 304 after the path planning module 120 applies the filters describe above. As illustrated in FIG. 3A, the path planning module 120, in conjunction with the yield estimator 122 and the crop destruction estimator 124, identifies several zones 306A-306D. The path planning module 120 identifies high yield zones 306A, a low yield zone 306B, a high yield zone 306C with the potential to damage crops, and high operation level zone 306D. As illustrated in FIG. 3B, the replanned guidance lines 304 eliminate segments that cause destruction above the destruction threshold and have an operation level lower than operation threshold.

Figure 4A:
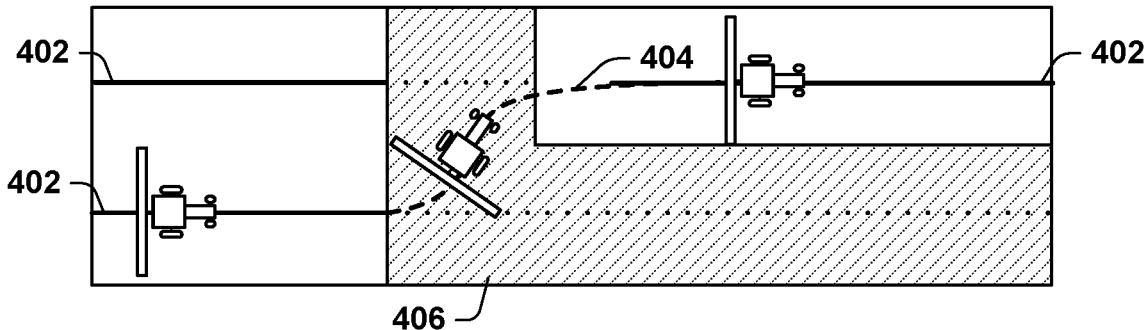
FIGS. 4A and 4B illustrate a path of a vehicle to transition between guidance lines as planned by the system of FIG. 1, in accordance with the teachings of this disclosure.
Figure 4B:
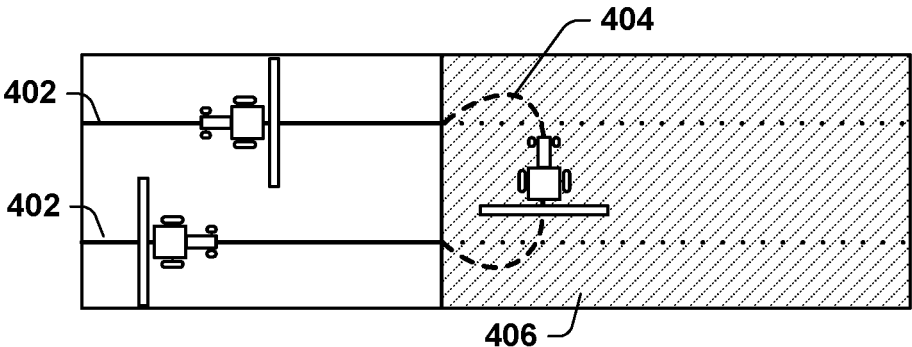

FIGS. 4A and 4B illustrate examples of replanned guidance lines 402. In the illustrated examples, the path planning module 120 adds transitions 404 between the replanned guidance lines 402. The replanned guidance lines 402 add the transitions 404 to move from one guidance line 402 to another while treating yield zones 406 below the yield threshold as being empty land available to be used as a transition. The path planning module 120 may use existing techniques to plan the transitions 404 such that the yield zones 406 below the yield threshold as being empty land available to be used as a transition. In some examples, the cumulative fuel cost (F), the labor cost (L) and the operational cost (O) for the transitions 404 are proportionally attributed to each segment when determining the operation level of the segment.

Figure 6:
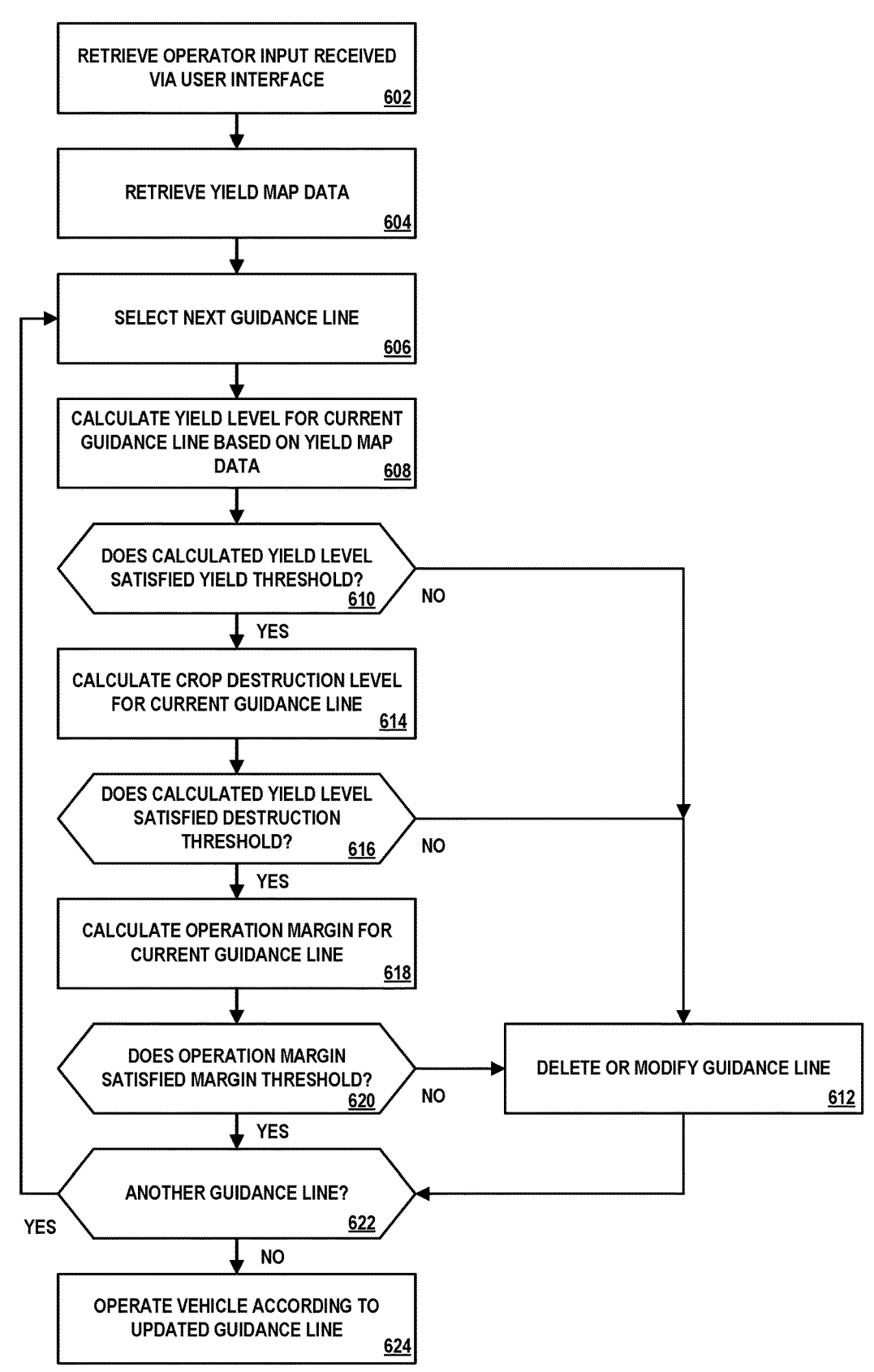
FIG. 6 is a flowchart of an example method to filter and plan the guidance lines by the system FIG. 1, in accordance with the teachings of this disclosure.

FIG. 6 is an example flowchart of the method to filter guidance lines. Initially, the path planning module 120 retrieves operator input of the yield threshold, the destruction threshold, and the operation threshold from the user interface 114 (block 602). The path planning module 120 retrieves or otherwise receives the yield map 134 from the central data processing system 104 (block 604). The path planning module 120 selects the next guidance line (block 606). In the illustrated example, the path planning module 120 filters guidance line-by-guidance line. However, the path planning module 120 may alternatively or additionally filter segment-by-segment of each guidance line.

The path planning module 120 calculates the yield level for the current guidance line based on the yield map 134 (block 608). In some examples, the yield level may be based on the yield map 134 and the attributes of the implement attached to the vehicle. For example, if the implement is a combine harvester, the yield level may be based on the yield map 134 and the width of the combine head. The path planning module 120 determines whether the calculated yield level satisfies the yield threshold (block 610). If the calculated yield level does not satisfy the yield threshold (NO at block 610), the path planning module 120 deletes or modifies the portion of the guidance line that does not satisfy the threshold (block 612).

If the calculated yield level satisfies the yield threshold (YES at block 610), the path planning module 120 calculates the crop destruction level associated with the guidance line (block 614). The path planning module 120 determines whether the calculated yield level satisfies the destruction threshold (block 616). If the calculated yield level does not satisfy the destruction threshold (NO at block 616), the path planning module 120 deletes or modifies the portion of the guidance line that does not satisfy the threshold (block 612).

If the destruction percentage satisfies the destruction threshold (YES at block 616), the path planning module 120 calculates the operation level associated with the guidance line (block 618). The path planning module 120 determines whether the calculated operation level satisfies the destruction threshold (block 620). If the calculated yield level does not satisfy the operation threshold (NO at block 620), the path planning module 120 deletes or modifies the portion of the guidance line that does not satisfy the threshold (block 612).

If the operation level satisfies the operation threshold (YES at block 620) or after the path planning module 120 deletes or modifies the portion of the guidance line that does not satisfy the thresholds (at block 612), the path planning module 120 determines whether there is another guidance line to filter (block 622). When there is another guidance line to filter (YES at block 622), the path planning module 120 selects the next guidance line (block 606). When there is not another guidance line to filter (NO at block 622), the guidance module 126 controls the vehicle according to the filtered guidance lines (block 624).

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The terms "includes," "including," and "include" are inclusive and have the same scope as "comprises," "comprising," and "comprise," respectively. The claims as follows are intended to include all modifications and alterations insofar as they come within the scope of the claims or the equivalent thereof.

Having thus described the invention, the following is claimed:

1. A system of filtering a path of a vehicle, the system comprising:
a user interface configured to support the selection of a threshold value used to filter the path of the vehicle;
a data processor configured to:
receive the path that defines guidance lines and transitions between guidance lines, the guidance lines defining movement of the vehicle though a work area or field;
filter the path by deleting portions of the guidance lines that do not satisfy the threshold value; and
a guidance module to control at least one motive function of the vehicle based on the filtered path;
wherein the threshold value is yield value, and wherein the data processor is further configured to:
receive a yield map that defines coordinate-based yields of the work area or field;
calculate yields for the guidance lines based on the yield map; and
delete the portions of the guidance lines where the yields are less than the yield value.

2. The system of claim 1, wherein the data processor is configured to prioritize deletion of the portions of the guidance lines based on a prioritization rule.

3. The system of claim 1, wherein the data processor is configured to recalculate the transitions between the guidance lines to account for the deleted portions.

4. The system of claim 3, wherein to recalculate the transitions between the guidance lines, the data processor is configured to treat portions of the work area or field that have a yield value below a yield threshold as not part of the work are or field.

5. The system of claim 1, wherein the user interface is configured to support the selection of a second threshold value used to filter the path of the vehicle, wherein the second threshold value is one of a threshold destruction percentage, and an operation level value.

6. A method for filtering a path of a vehicle, the system comprising:
receiving, on a user interface on a display, a selection of a threshold value used to filter the path of the vehicle;
receiving, by a data processor, the path that defines guidance lines and transitions between guidance lines, the guidance lines defining movement of the vehicle though a work area or field;
filtering, by the data processor, the path by deleting portions of the guidance lines that do not satisfy the threshold value; and
controlling, by a guidance module, at least one motive function of the vehicle based on the filtered path;
wherein the threshold value is yield value, and wherein the method further comprises:
receiving, by the data processor, a yield map that defines coordinate-based yields of the work area or field;
calculating, by the data processor, yields for the guidance lines based on the yield map; and
deleting, by the data processor, the portions of the guidance lines where the yields are less than the yield value.

7. The method of claim 6, further comprising prioritizing deletion of the portions of the guidance lines based on a prioritization rule.

8. The method of claim 6, further comprising recalculating, by the data processor, the transitions between the guidance lines to account for the deleted portions.

9. The method of claim 8, wherein recalculating the transitions between the guidance lines further comprises treating portions of the work area or field that have a yield value below a yield threshold as not part of the work are or field.

10. The method of claim 6, wherein receiving the selection of the threshold value further comprises receiving the selection of a second value used to filter the path of the vehicle, wherein the second threshold value includes one of a threshold destruction percentage and an operation level value.

* * * * *